(12) United States Patent
Tran et al.

(10) Patent No.: US 7,225,318 B2
(45) Date of Patent: May 29, 2007

(54) DYNAMIC PREFETCH IN CONTINUOUS BURST READ OPERATION

(75) Inventors: Wayne Tran, Folsom, CA (US); Henry Wong, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 10/681,070

(22) Filed: Oct. 8, 2003

(65) Prior Publication Data
US 2005/0081014 A1    Apr. 14, 2005

(51) Int. Cl.
*G06F 12/00* (2006.01)

(52) U.S. Cl. .................. 711/213; 711/137; 712/207

(58) Field of Classification Search ............. 712/207, 712/237; 711/213
See application file for complete search history.

(56) References Cited

U.S. PATENT DOCUMENTS

| | | | |
|---|---|---|---|
| 5,696,917 A | 12/1997 | Mills et al. | 395/401 |
| 5,854,911 A * | 12/1998 | Watkins | 712/207 |
| 6,216,180 B1 | 4/2001 | Kendall et al. | 710/35 |
| 6,266,282 B1 | 7/2001 | Hwang et al. | 365/185.33 |
| 6,363,463 B1 | 3/2002 | Mattison | 711/164 |
| 6,425,062 B1 | 7/2002 | Kendall et al. | 711/167 |
| 6,453,388 B1 * | 9/2002 | Gonzales et al. | 711/137 |
| 6,580,659 B1 | 6/2003 | Roohparvar | 365/233 |
| 6,594,730 B1 | 7/2003 | Hum et al. | 711/137 |
| 2002/0114325 A1 * | 8/2002 | Dale et al. | 370/355 |
| 2004/0117556 A1 * | 6/2004 | Kadi | 711/137 |
| 2005/0132173 A1 * | 6/2005 | Moyer et al. | 712/238 |

OTHER PUBLICATIONS

Sunaga et al., "A Full Bit Prefetch Architecture for Synchronous DRAM's," in IEEE Journal of Solid State Circuits, vol. 30, Issue 9, Sep. 1995.*
IEEE Dictionary of Standards Terms, 2000, IEEE, Seventh Edition, p. 743.*

* cited by examiner

*Primary Examiner*—Brian R. Peugh
*Assistant Examiner*—Matthew Bradley
(74) *Attorney, Agent, or Firm*—Trop, Pruner & Hu, P.C.

(57) ABSTRACT

In a continuous burst memory read operation, a dynamic prefetch circuit compares a prefetched address with a received address. If the compared addresses are identical, the prefetched address is applied to the memory; else the prefetched address is preempted by the received address, the received address is coupled to the memory, and output data corresponding to the prefetched address is interrupted.

13 Claims, 4 Drawing Sheets

DYNAMIC PREFETCH IN CONTINUOUS BURST READ OPERATION

BACKGROUND

Memory systems are occasionally caused to operate in a continuous burst read mode. In general, continuous burst read operation connotes a mode of operation in which a memory read request specifies a starting address from which data retrieval is to be initiated. Subsequent to the retrieval of data stored at the requested starting address, data is sequentially retrieved at successive continuous addresses. The continuous burst read operation may continue until the desired data stored in the target memory device is sensed and transferred from the memory, or until an event occurs to interrupt the otherwise continuous transfer of data from sequential addresses. Because the continuous burst read operation enables addresses and data to be prefetched in a manner that obviates latencies otherwise encountered, enhanced data transfer rates may be realized.

However, if an intervening read request, or some other event, occurs in the course of a continuous burst read operation, intervention of the ongoing continuous data read operation will be required. In this situation, the prefetched address becomes erroneous because that address no longer represents an address from which data is presently requested. Without remediation, application of the (erroneous) prefetched address can cause spurious data to appear at the memory output when an intervening address request is received that is not identical to the anticipated prefetched address. Accordingly, what is required is a technique that assures desired operation of a memory system when, in the course of a burst read operation, the received next address is different from the prefetched address.

BRIEF DESCRIPTION OF THE DRAWINGS

The subject "Dynamic Prefetch In Continuous Burst Read Operation" may be better understood by, and its many features, advantages and capabilities made apparent to, those skilled in the art with reference to the Drawings that are briefly described immediately below and attached hereto, in the several Figures of which identical reference numerals (if any) refer to identical or similar elements, and wherein.

Skilled artisans appreciate that elements in Drawings are illustrated for simplicity and clarity and have not (unless so stated in the Description) necessarily been drawn to scale. For example, the dimensions of some elements in the Drawings may be exaggerated relative to other elements to promote and improve understanding of embodiments of the invention.

DETAILED DESCRIPTION

Figure 1:
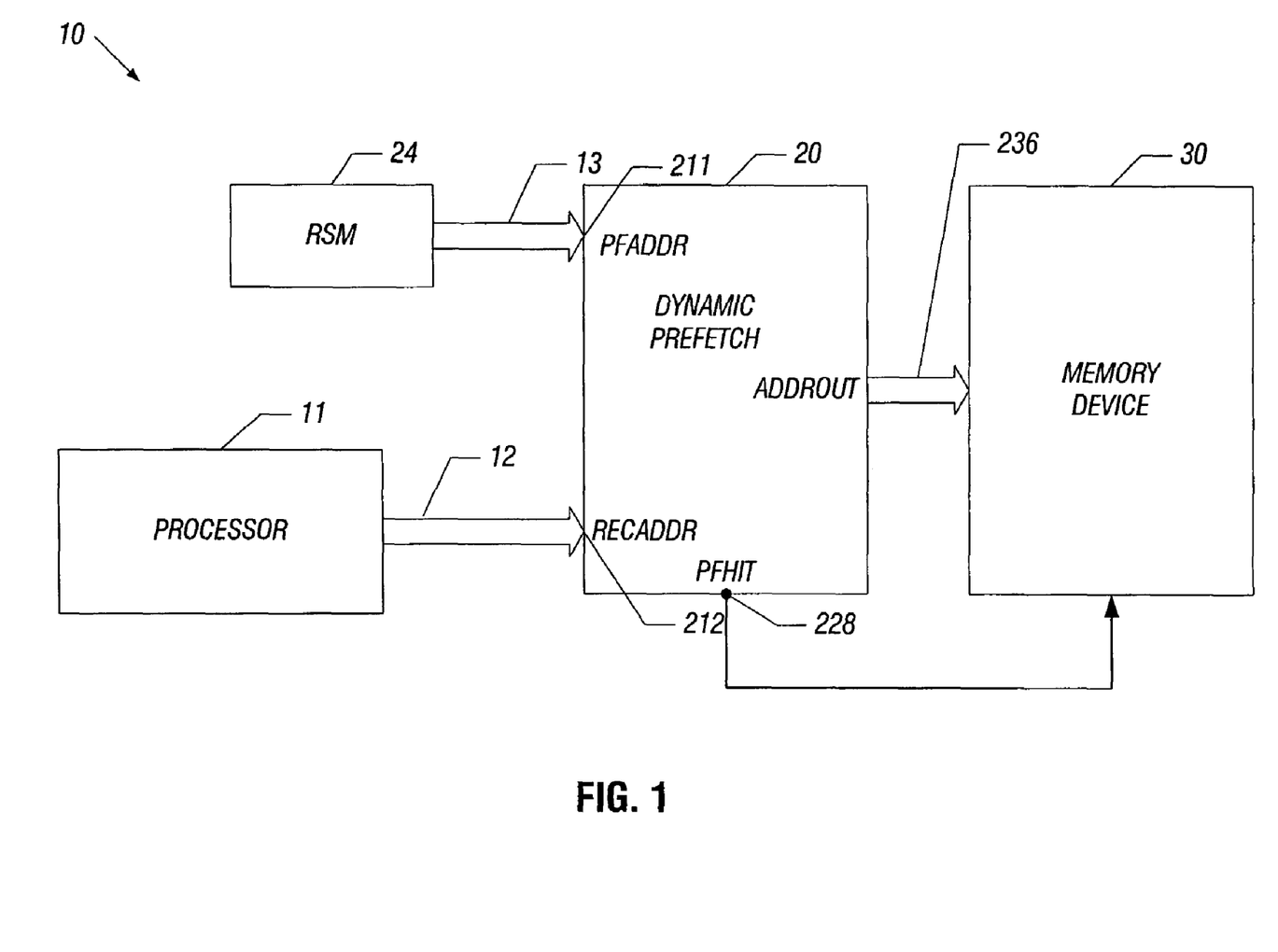
FIG. 1 is a system block diagram illustrating the interconnection of a processor to a memory device through a dynamic prefetch circuit in accordance with an embodiment of the invention.

Referring now to FIG. 1, a generalized processor-based system 10, in accordance with an embodiment of the invention, includes a processor 11 that is coupled to a memory system, in the form of memory device 30, through a dynamic prefetch circuit 20. Processor 11 may be a general-purpose or special-purpose processor, such as a microprocessor, a digital signal processor (DSP), a microcontroller, an application-specific integrated circuit (ASIC), a programmable gate array (PGA), and the like. Processor 11 may be coupled to dynamic prefetch circuit 20 through a conductive medium, such as, in one embodiment, a wired bus 12; however, the scope of the invention is not confined by the mechanism or medium through which processor 11 is coupled to dynamic prefetch circuit 20.

For purposes relevant here, it is sufficient to note that processor 11 provides address data, that is, a received address (RECADDR) to an address input of dynamic prefetch circuit 20. In one embodiment, dynamic prefetch circuit 20 may present an address input 211 to accept a prefetched address (PFADDR) from a prefetched address generator 24 and may present an address input 212 to accept RECADDR from, for example, processor 11. (Note that in alternative embodiments, the RECADDR input to dynamic prefetch address circuit 20 may come from external sources other than a system processor.) In one embodiment, prefetch address generator 24 may be realized in the form of a read state machine (RSM). However, dynamic prefetch circuit 20 accommodates numerous approaches to the provision of a prefetched address in furtherance of a continuous burst read operation. For purposes of this Description, it is adequate to appreciate that RSM 24 provides, in response to initial read-request address data and burst-size information, appropriate PFADDRs to dynamic prefetch address circuit 20. In one embodiment, prefetched address generator (RSM) 24 is coupled to dynamic prefetch circuit 20 through, for example, a bus 13. Burst-size information may originate with processor 11, for example.

In a manner that will be described fully below, dynamic prefetch circuit 20 compares PFADDR, applied at address input 211, to RECADD, applied at address input 212. If PFADDR and RECADDR are identical, then output 228, PFHIT (connoting a prefetch address "hit"), of dynamic prefetch circuit 20 assumes, in one embodiment, a logic level ONE. If PFADDR and RECADDR are not identical, then the PFHIT output 228 of dynamic prefetch circuit 20 assumes, in said embodiment, a logic level ZERO. (Clearly, polarity reversal of PFHIT is within the scope of the invention, as are any other definitions of the signal PFHIT that may usefully indicate identically, vel non, between PFADDR and RECADD.)

The PFHIT signal may be used internally by dynamic prefetch circuit 20 to select the address data that appears at ADDROUT output 236. Specifically, if PFHIT assumes a logic level ONE (for example), then the address data that appears at ADDROUT output 236 is selected to be PFADDR. Conversely, if PFHIT assumes a logic level ZERO (for example), then the address data that appears at ADDROUT output 236 is selected to be RECADDR. Operationally, ADDROUT is the address that is ultimately applied to memory device 30. PFHIT at logic level ONE indicates that the prefetched address generated by RSM 24 is the desired address; PFHIT at logic level ZERO indicates that, in the course of a continuous burst read operation, the prefetched address is not the desired address. That is, a read address is requested (e.g., by processor 11) that diverges from the read address anticipated by RSM 24. Consequently, dynamic prefetch circuit 20 assures that, in this instance, RECADDR preempts PFADDR. In addition to effecting the appropriate address data output, PFHIT output 228 may be coupled from dynamic prefetch circuit 20 to memory device 30 so that the data output of memory device 30, which may likely be spurious as a result the application of a erroneous (PFADDR) address data to memory device 30, is diverted.

Figure 2:
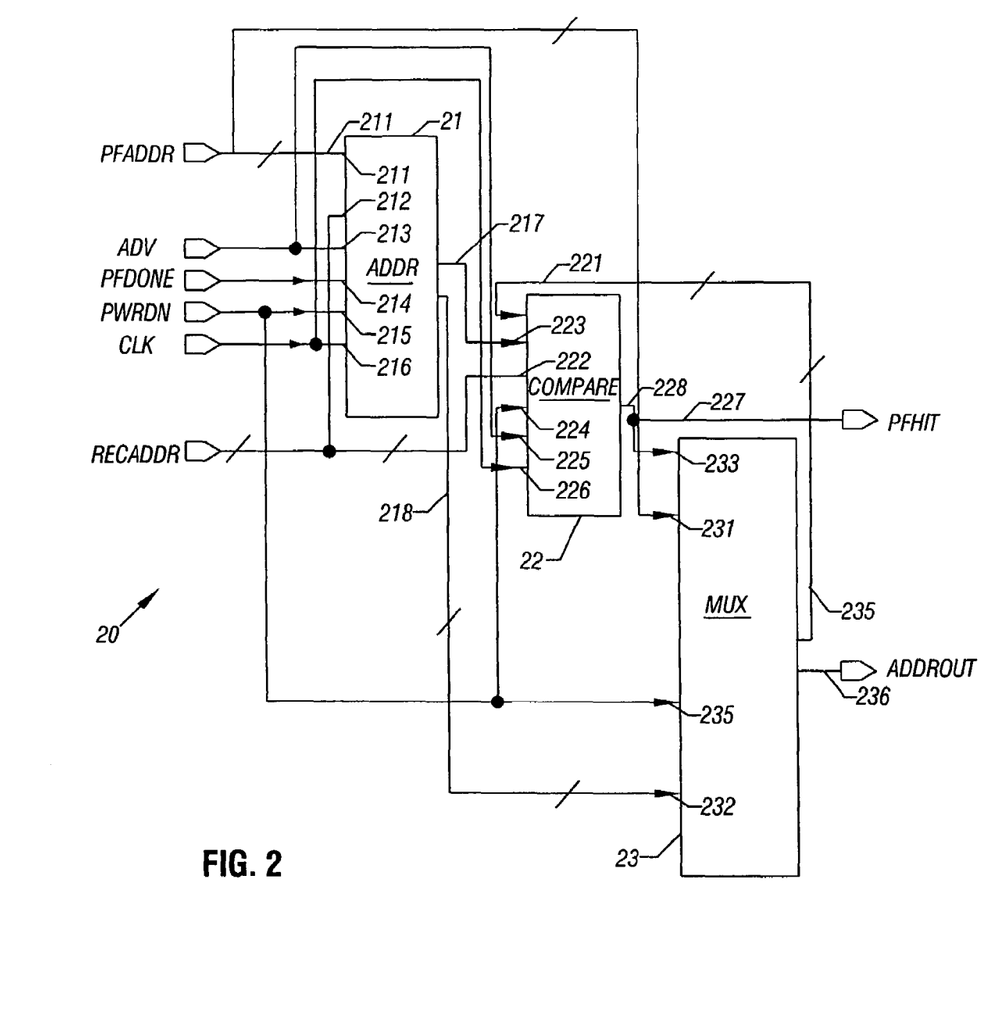
FIG. 2 is a high-level circuit diagram of a dynamic prefetch circuit in accordance with an embodiment of the invention.

Referring now to FIG. 2, depicted therein is a more detailed representation of dynamic prefetch circuit 20 in accordance with one embodiment of the invention. Dynamic prefetch circuit 20 is seen in FIG. 2 to comprise an address latch (ADDR) 21, an address comparator (COMPARE) 22, and an address multiplexer (MUX) 23. As indicated above, dynamic prefetch circuit 20 operates in the course of a continuous burst read operation to compare a prefetched address (generated by a prefetch address generator) to a received address. The prefetched address is a memory address that corresponds to the next address from which data is expected to be read in the projected course of burst read operation. More precisely, in burst read mode, the prefetched address is the starting address of a block of data that may be retrieved from a predetermined number (for example, four) of memory locations. That is, a burst read may refer to the retrieval of more than one unit of data in response to a single read request.

A unit may be a byte of data, a word of data, or a double word of data. It should be noted that the terms "byte," "word," "double word," are terms denoting different units of data. As an example, a byte of data may refer to eight bits of data; a word may refer to 16 bits of data; and a double word may refer to 32 bits of data. If it is assumed that a double word of data (32 bits) is stored in each memory location of the target memory (e.g., memory 30) and, further, that four consecutive memory locations are read as a result of each read request, then 128 bits of data may be read during a single burst read operation. Be aware, however, that the amount of data stored in a memory location, as well as the size of the burst read (number of consecutive memory locations read), are not limitations on the scope of the invention.

Continuous burst read operation may be understood to be predicated on an assumption that the burst read sequence will continue, so that read operations will proceed seriatim, with the starting address of each burst read operation having a value equal to the previous starting address, incremented by the number (say, 4) of memory locations that constitute the prescribed block of data.

However, the assumption of continuity on which continuous burst read operation is predicated occasionally fails. That is, it may occur in the course of a continuous burst read operation that a preemptive read request is received from, for example, a processor, a memory controller or some other source. In this instance, the prefetched address is not operative, and remedial measures must be taken in response to the preemptive read request. It is in this context that the operation of prefetch circuit 20 becomes particularly relevant. In a manner that will be explained in detail below, dynamic prefetch circuit 20 may detect an event (such as, for example, a received address that differs from the prefetched address) that interrupts the burst read operation, apply the appropriate next address to the memory, and divert (or dump) corrupt data that may have been retrieved from memory device 30.

Recall that dynamic prefetch circuit 20 receives both a prefetched address (PFADDR) and a received address (RECADDR) from a user through operation of a processor, for example. PFADDR and RECADDR are latched in ADDR 21 and are also applied to MUX 23. In a manner discernable from FIG. 2, PFADDR and RECADDR are also applied to and are compared in an address comparator, such as COMPARE 22. As indicated above, COMPARE 22 provides a PFHIT output 228 that indicates whether identically obtains between PFADDR and RECADDR.

(Be aware that, in the context of this Description, PFADDR and RECADDR may be said to be "identical" if they identify the same physical memory location. It is not necessary that PFADDR and RECADDR be represented by precisely identical binary (or hexadecimal, for example) numbers. In fact, in typical embodiments, PFADDR and RECADDR may be represented by different hexadecimal numbers, yet both representations refer to the same physical memory address. This situation may result when, for example, a physical memory location is uniquely defined by 18 bits. In this case, only the 16 most significant bits (MSBs) may be required to specify a PFADDR, given the size of the burst read.)

PFHIT is applied to a control input 233 of MUX 23, so that MUX 23 is caused to output PFADDR (the prefetched address) if a hit (prefetched address equal to received address) is detected. Conversely, MUX 23 is caused to output RECADDR (the received address) if a miss (prefetched address not equal to received address) is detected. In addition, the PFHIT output 228 of COMPARE 22 is provided to target memory device 30 so that the propagation of spurious data may be truncated. In this regard, data may be here deemed spurious to the extent that the data has been retrieved from memory locations that are derived from a preempted prefetched address.

Paying more detailed attention now to FIG. 2, observe there that ADDR 21 presents an address input 211, to which PFADDR is applied, and presents an address input 212, to which RECADDR is applied. In addition to address inputs 211 and 212, ADDR 21 presents respective additional input nodes 213, 214, 215 and 216. ADV input 213 accepts an address valid signal that is provided by the source of received address signals (for example, a system processor). ADV indicates to ADDR 21 that the address data appearing at input 212 represents a valid received address. Similarly, PFDONE (prefetch done) input 214 accepts a signal that is received from the prefetched address generator (e.g., RSM 24) that indicates that the valid prefetched address data is present at input 211 of ADDR 21. CLK input 216 receives the system clock as an input. PWRDN input 215 receives a signal that indicates, for example, that the system is in a dormant state. (A PWRDN signal may appear, for example, when no system activity has been initiated by a user over a requisite period of time.) ADDR 21 provides at output 217 a PFVALID signal to input 223 of COMPARE 22. In one embodiment of the invention, PFVALID is a clocked version of PFDONE. Specifically, PFVALID output 217 is valid (e.g., assumes a logic level ONE) in response to the PFDONE signal at input 214. That is, a logic level ONE at PFVALID output 217 indicates that valid prefetched address data exists after a memory address prefetch operation has been completed. In a manner that will become clear imminently, PFVALID is used to gate the comparison of the prefetched address and the received address in COMPARE 22. In addition, ADDR 21 provides RECADDR at output 218 to input 232 of MUX 23.

Directing attention now to COMPARE 22 in FIG. 2, COMPARE 22 is seen there to provide an address input 221. Address input 221 accepts latched PFADDR data from an output 235 of MUX 23. In addition, COMPARE 22 accepts RECADDR data at an address input 222. Furthermore, COMPARE accepts at input 223 the PFVALID signal from ADDR 21, the PWRDN signal (see above) at input 224, the ADV signal at input 225, and the CLK signal at input 226. COMPARE 22 provides PFHIT at an output node 228. PFHIT assumes a first value (e.g., a logic level ONE) when COMPARE 22 determines that the prefetched address at input 221 is identical to the received address at input 222. PFHIT assumes a second value (e.g., a logic level ZERO) when the prefetched address and the received address are not identical. Accordingly, appearance of the first value at output 227 is designated a "hit," and the appearance of the second value at output node 227 is designated a "miss". As may be seen in FIG. 2, the PFHIT output of COMPARE 22 is coupled to input 233 of MUX 23 and is also distributed to memory array 30 in a manner that selectively enables or disables the data output of the memory. That is, in any one of a number of approaches that will be discerned by skilled practitioners, the application of PFHIT to memory device 30 causes appropriate data to appear at the output of memory device 30, regardless of the occurrence of an unanticipated interruption in the continuous burst read operation.

Understand that specific aspects of the design and operation of memory device 30 do not constitute an aspect, or limitation on the scope, of the subject invention. Similarly, operation of the subject invention extends to numerous memory technologies, now known or hereafter developed. Nonetheless, allusion to the salient common features of prevailing memory designs is considered here to contribute to an appreciation of the operation of embodiments of the invention. Assume, then, that memory device 30 is instantiated in the form of a more or less familiar flash memory, although other memory technologies are similarly candidate beneficiaries of embodiments of the invention. Accordingly, memory 30 will comprise an array of memory cells arranged in rows and columns. Each site in the array is populated by a cell, the design of which may incorporate one or more metal oxide semiconductor (MOS) transistors, or other suitable data storage devices. The array of cells is accessed through, for example, an address buffer that is coupled through address latches and address counters to row and column decoders. Selected cells are coupled to sense amplifiers that detect the (logical) contents of respective cells. The sense amplifiers are, in turn, typically coupled through a multiplexer to input/output (I/O) buffers. Consequently, although the subject invention contemplates all modalities that effect selective disabling (or enabling) of the data output of memory 30 in response to the value assumed by PFHIT, for convenience it may be assumed that the data output of memory 30 may be disabled simply be disabling the output buffers. In some circumstances, more elaborate approaches may be warranted or required to prevent the propagation of corrupt data from the memory array 30.

Returning to COMPARE 22, in operation COMPARE 22, in one embodiment, performs a gated synchronous comparison between the respective address data at inputs 221 and 222. Operation of COMPARE 22 is gated in the sense that its PFHIT output will be active only if the requisite PFVALID signal exists at input 223. (In this sense, at least, input 223 may be considered an "enable" input of COMPARE 22). Operation of COMPARE 22 is synchronous in that the transitions (if any) in the PFHIT output occur at falling (for example) edges of the CLK signal at input 226. In this manner, the PFHIT output of COMPARE 22 will change state synchronously with the downstream sensing of data from memory, which may also be controlled by the system clock.

As to MUX 23, it may be seen from FIG. 2 that MUX 23 accepts PFADDR data from the prefetch address generator 24 at a first address input 231. MUX 23 accepts RECADDR address data from output 218 of ADDR 21 at a second address input 232. As indicated herein above, the ADDROUT data at output 236 of MUX 23 may be coupled to the address input of memory 30. That is, ADDROUT selected to be PFADDR if PFHIT output 227 of COMPARE 22, which is seen in FIG. 2 to be coupled to control input 233 of MUX 23, indicates a hit (logic ONE) and is selected to be RECADDR if COMPARE 22 indicates a miss (logic ZERO).

Note that in the embodiment of FIG. 2, the PFADDR input 221 of COMPARE 22 is provided by output 235 of MUX 23. In the referenced embodiment, MUX 23 comprises address data latches, so that output 235, and of course, the PFADDR input 221 to COMPARE 12, are latched. In this manner, the PFADDR input to COMPARE 22 is preserved intact, irrespective of anomalies that may arise in the course of burst read operation.

The dynamic prefetch circuit depicted in the embodiment of FIG. 2 is, in the manner described above, used in connection with memory device 30. Memory device 30 is configured to store information such as, for example, instructions or data that constitute a part of, or that are used by, an operating system or other software program that may be executed by a processor. In some embodiments, the memory device may be a volatile memory such as, for example, a static random access memory (SRAM) or a dynamic random access memory (DRAM), although the scope of the claimed subject matter is not limited in this respect. In alternate embodiments, the memory device may be a nonvolatile memory such as, for example, an electrically programmable read-only memory (EPROM), an electrically erasable and programmable read only memory (EEPROM), a flash memory (NAND or NOR type, including multiple bits per cell), a ferroelectric random access memory (FRAM), a disk memory such as, for example, an electromechanical hard disk, an optical disk, a magnetic disk, or any other device capable of storing instructions and/or data. Other types of nonvolatile memory are also amenable to operation in combination with the subject dynamic prefetch circuit, including volatile memory with a battery backup, inasmuch as the battery may prevent the memory from losing its contents when the main power source is disrupted or interrupted.

Figure 3:
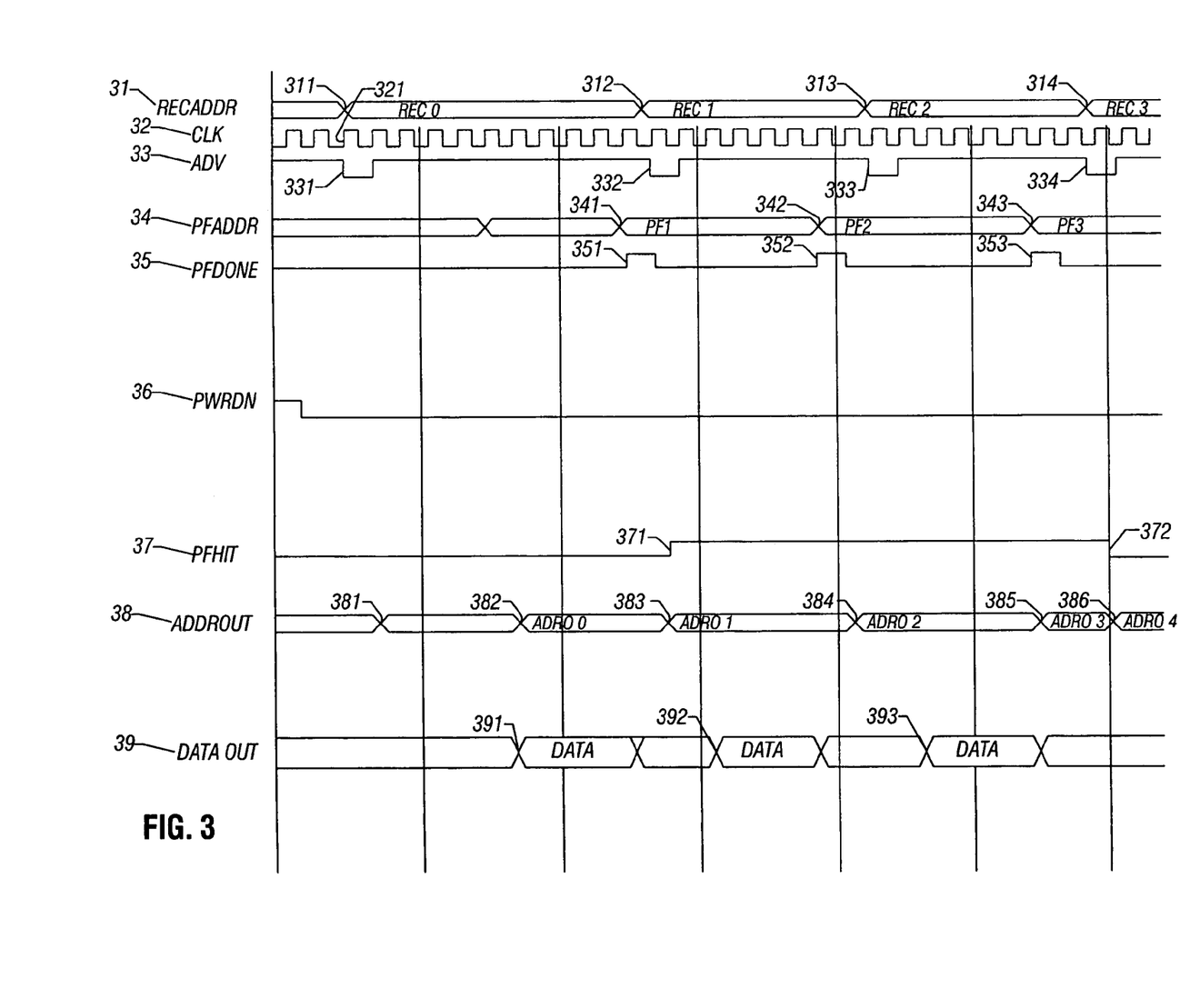
FIG. 3 is a timing diagram that illustrates relationships between signals observed in the operation of an embodiment of the invention.

Attention is here directed to FIG. 3, which constitutes a timing diagram that articulates the temporal relationships between significant signals introduced above, as these signals may arise in accordance wit one embodiment of the invention. As may be seen in FIG. 3, the set of time-variant and interrelated signals defined therein include the RECADDR 31, system clock (CLK) 32, ADV 33, PFADDR 34, PEDONE 35, PWRON 36. PEHLT 37, ADDROUT 38 (at ADDROUT output 236 of MUX 23 in FIG. 2), and DATA OUT 39. Initially, at time 311 a received address, REC0 appears from, for example, a system processor. Reception of the address REC0 is coincident with the rising edge of CLK 32 that appears at time 321, as well as with the falling edge of ADV that occurs at time 331. Because the address received at the time 311 is, for purposes relevant here, assumed to be the initial received address, output 136 of MUX 13, ADDROUT, will assume a value of ADRO0 at time 381, also coincident with times 311, 321 and 331. Assuming, for pedagogical purposes, that the memory read latency is six CLX periods, then corresponding data will appear at the memory output at time 391, six CLK cycles after the reception of the initial received address at time 311. At time 341, the RSM prefetch address generator outputs the first prefetched address PF1, resulting in a PEDONE pulse tat has a rising edge at time 351. Similar rising edges occur at times 352 and 353. The next corresponding received address, REC1, appears at time 312, after which the falling edge of ADV occurs at the time 332. Note that similar falling edges occur at times 333 and 334. Because, according to FIG. 3, the received address represents at hit, PFHIT assumes a logic level ONE at time 371. Consequently, output 236 of MUX 13 selects the prefetched address, and PFADDR is coupled to the memory device. Corresponding DATAOUT appears at time 392. The next address cycle similarly results in a hit, and at time 384 the prefetched address, PF2, that is available at time 342 appears as ADDROUT. Corresponding data arrives at time 393. PFHIT persists at a logic level ONE. Note the various values of ADDROUT at times 382, 383, and 385.

At time 343, 353, the sequential prefetched address PF3 is generated. However, at time 314 a received address REC3 appears that is not identical to the prefetched address at time 353. Consequently, at time 372, PFHIT reverts to a logic level ZERO. Additionally, at this time the output of MUX 23 is selected to be RECADDR, and the appearance of the ADRO3 is simultaneously truncated at time 386. Note that ADRO3 is an address that corresponds to PF3, the disqualified prefetched address. ADRO3 is replaced by ADRO4, an address that corresponds to the received address REC3.

Figure 4:
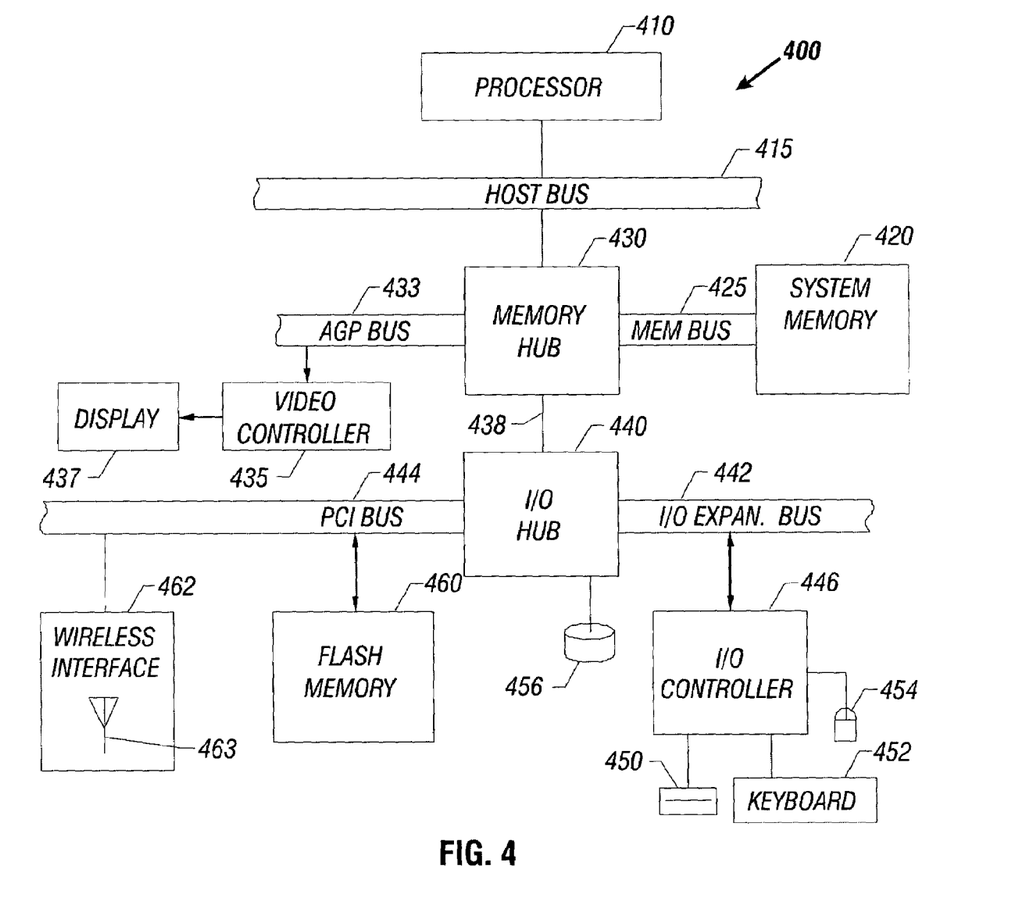
FIG. 4 is a system block diagram of a computer system in accordance with an embodiment of the invention.

FIG. 4 is a block diagram of a representative data processing system, namely computer system 400 with which embodiments of the invention may be used. In one embodiment, computer system 400 includes a processor 410, which may include a general-purpose or special-purpose processor such as a microprocessor, microcontroller, application specific integrated circuit (ASIC), a programmable gate array (PGA), and the like.

The processor 410 may be coupled over a host bus 415 to a memory hub (i.e., a memory controller) 430 in one embodiment, which may be coupled to a system memory 420 via a memory bus 425. The memory hub 430 may also be coupled over an Advanced Graphics Port (AGP) bus 433 to a video controller 435, which may be coupled to a display 437. The AGP bus 433 may conform to the Accelerated Graphics Port Interface Specification, Revision 2.0, published May 4, 1998, by Intel Corporation, Santa Clara, Calif.

Memory hub 430 may control the transfer of information within system 400, e.g., between processor 410, memory hub 430, and memory 420. That is, memory hub 430 may generate control signals, address signals, and data signals that may be associated with a particular write or read operation to memory 420.

In some embodiments, memory hub 430 may be integrated with processor 410 and/or with memory 420. In alternate embodiments, memory hub 430 may be a discrete component or dedicated chip. In other embodiments, portions of the functionality of memory hub 430 may be implemented in processor 410 or in memory 420 as, for example, a software application, module, or routine.

The memory hub 430 may also be coupled (via a hub link 438) to an input/output (I/O) hub 440 that is coupled to a input/output (I/O) expansion bus 442 and a Peripheral Component Interconnect (PCI) bus 444, as defined by the PCI Local Bus Specification, Production Version, Revision 2.1 dated in June 1995, or alternately a bus such as the PCI Express bus, or another third generation I/O interconnect bus. The I/O expansion bus 442 may be coupled to an I/O controller 446 that controls access to one or more I/O devices. As shown in FIG. 4, these devices may include in one embodiment storage devices, such as a floppy disk drive 450 and input devices, such as keyboard 452 and mouse 454. The I/O hub 440 may also be coupled to, for example, a hard disk drive 456 as shown in FIG. 4. It is to be understood that other storage media may also be included in the system. In an alternate embodiment, the I/O controller 446 may be integrated into the I/O hub 440, as may other control functions.

The PCI bus 444 may be coupled to various components including, for example, a flash memory 460 which may include the structure shown in the block diagram of FIG. 1. Further shown in FIG. 4 is a wireless interface 462 coupled to the PCI bus 444, which may be used in certain embodiments to communicate with remote devices. As shown in FIG. 4, wireless interface 462 may include a dipole or other antenna 463 (along with other components not shown in FIG. 4). In various embodiments, wireless interface 462 may be coupled to system 400, which may be a notebook personal computer, via an external add-in card, or an embedded device. In other embodiments wireless interface 462 may be fully integrated into a chipset of system 400.

Although the description makes reference to specific components of the system 400, it is contemplated that numerous modifications and variations of the described and illustrated embodiments may be possible. Moreover, while FIG. 4 shows a block diagram of a system such as a notebook personal computer, it is to be understood that embodiments of the present invention may be implemented in another wireless device such as a cellular phone, personal digital assistant (PDA) or the like. In such embodiments, a flash memory in accordance with an embodiment may be coupled to an internal bus which is in turn coupled to a microprocessor and a peripheral bus, which may in turn be coupled to a wireless interface and an associated antenna such as a dipole antenna, helical antenna, global system for mobile communication (GSM) antenna, and the like.

In addition, skilled practitioners recognize that embodiments may also be realized in software (or in the combination of software and hardware) that may be executed on a host system, such as, for example, a computer system, a wireless device, or the like. Accordingly, such embodiments may comprise an article in the form of a machine-readable storage medium onto which there are written instructions, data, etc. that constitute a software program that defines at least an aspect of the operation of the system. The storage medium may include, but is not limited to, any type of disk, including floppy disks, optical disks, compact disk read-only memories (CD-ROMs), compact disk rewritables (CD-RWs), and magneto-optical disks, and may include semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a computer processor or a custom designed state machine.

Accordingly, from the Description above, it should be abundantly clear that the subject invention constitutes a substantial embellishment in continuous burst read techniques. To wit: the invention circumvents effects attendant the appearance of spurious data output that would otherwise result when, in the source of a continuous burst read from memory, an anticipated memory address is requested from a preemptive source.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    an address multiplexer having a control input;
    an address comparator having a received address input, a prefetched address input, and an output coupled to the control input of the address multiplexer; and
    an address latch having a first input to accept a prefetched address, a second input to accept a received address, and an address output coupled to a received address input of the address multiplexer to provide the received address to the address multiplexer, wherein the address latch has an output coupled to an enable input of the address comparator to cause the address comparator to be enabled when valid prefetched address data is determined to exist at the first input of the address latch.

2. An apparatus as defined in claim 1, wherein the address comparator output is to assume a first value when the received address input is identical to the prefetched address input and to assume a second value when the received address input is not identical to the prefetched address input.

3. An apparatus as defined in claim 2, wherein when the address comparator output is the first value, the address multiplexer is to provide the prefetched address to an address multiplexer output.

4. An apparatus as defined in claim 2, wherein when te address comparator output is the second value, the address multiplexer is to provide the received address to an address multiplexer output.

5. An apparatus as defined in claim 2, wherein the address comparator is enabled only when valid prefetched address data is determined to exist at the prefetched address input of the address comparator.

6. An apparatus as defined in claim 5, wherein when the address comparator output is the first value, the address multiplexer is to output the prefetched address.

7. An apparatus as defined in claim 5, wherein when the address comparator output is the second value, the address multiplexer is to output the received address.

8. An apparatus as defined in claim 1, wherein the address multiplexer has a first address output coupled to a memory and a second address output coupled to the prefetched address input of the address comparator.

9. An apparatus as defined in claim 8, wherein the address comparator output is to assume a first value when the received address input is identical to the prefetched address input and is to assume a second value when the received address input is not identical to the prefetched address input.

10. A system comprising:
    a dynamic prefetch circuit coupled to a memory, the dynamic prefetch circuit comprising:
    an address multiplexer having a control input;
    an address comparator having a received address input a prefetched address input, and an output coupled to the control input of the address multiplexer; and
    an address latch comprising a first address input to couple to a prefetched address generator, a second address input to couple to a source of received addresses, a first control input to receive a signal to indicate that valid prefetched address data exists at the first address Input of the address latch, a second control input to receive a signal to indicate that valid received address data is present at the second address input of the address latch, a clock input coupled to a system clock, and a control output coupled to an enable input of the address comparator to cause the address comparator to be enabled only when valid prefetched address data is determined to exist at the prefetched address input of the address comparator and to cause the address comparator output to change state synchronously with the system clock, and an address output coupled to a received address input of the address multiplexer; and
    an antenna coupled to the dynamic prefetch circuit.

11. A system as defined in claim 10, wherein the address comparator output corresponds to a first value when the received address input is identical to the prefetched address input and corresponds to a second value when the received address input is not identical to the prefetched address input.

12. A system as defined in claim 11, wherein when the address comparator output is the first value, the address multiplexer is to output the prefetched address.

13. A system as defined in claim 10, wherein the address multiplexer has an output coupled to the prefetched address input of the address comparator.

* * * * *

UNITED STATES PATENT AND TRADEMARK OFFICE
CERTIFICATE OF CORRECTION

PATENT NO. : 7,225,318 B2 Page 1 of 1
APPLICATION NO. : 10/681070
DATED : May 29, 2007
INVENTOR(S) : Wayne Tran et al.

It is certified that error appears in the above-identified patent and that said Letters Patent is hereby corrected as shown below:

<u>Column 9</u>:
Line 31, "te" should be --the--.

Signed and Sealed this

Fourteenth Day of August, 2007

JON W. DUDAS
*Director of the United States Patent and Trademark Office*